Oct. 25, 1932.    E. HELLER    1,883,910
METAL BUILDING FRAMING ELEMENT CONSTRUCTION
Filed May 20, 1930
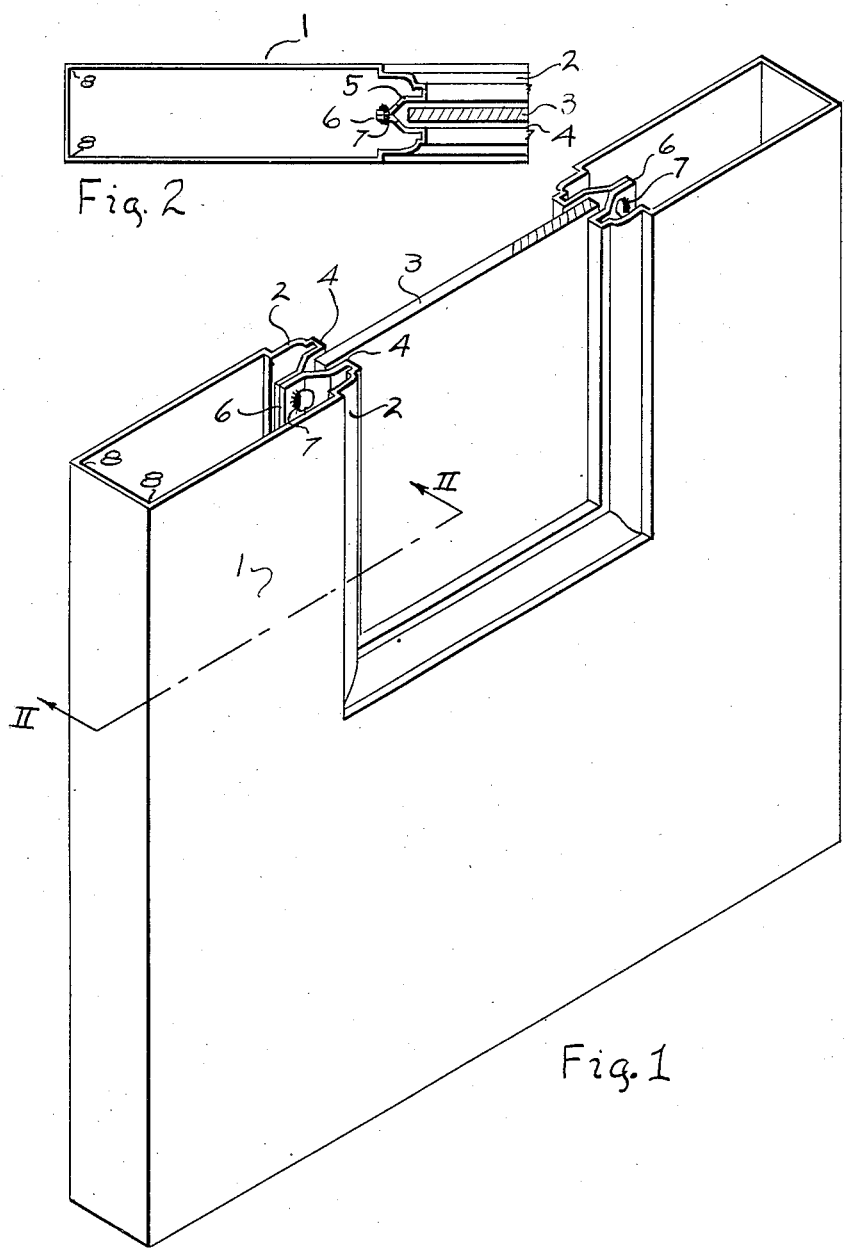
INVENTOR.
EDWARD HELLER
BY
Fay Oberlin & Fay
ATTORNEYS.

Patented Oct. 25, 1932

1,883,910

UNITED STATES PATENT OFFICE

EDWARD HELLER, OF CLEVELAND, OHIO, ASSIGNOR TO THE E. F. HAUSERMAN COMPANY, OF CLEVELAND, OHIO, A CORPORATION OF OHIO

METAL BUILDING FRAMING ELEMENT CONSTRUCTION

Application filed May 20, 1930. Serial No. 458,952.

This invention relates to metallic building elements, and more particularly to construction where glazing or other panel filling elements are to be employed, such as doors, and stretcher-holding framing generally. It is among the objects of the invention to provide a construction in which joints are concealed, and in which the joint structure is at the same time durable and strong, and yet simple and convenient of manufacture. Another object is the provision of construction in which welding may be applied in a manner to provide seams without objectionable distortion. Other objects and advantages will appear as the description proceeds.

To the accomplishment of the foregoing and related ends, the invention, then, consists of the features hereinafter fully described, and particularly pointed out in the claims, the following description and the annexed drawing setting forth in detail certain structure illustrative of the invention, this being indicative however of but one of the various ways in which the principle of the invention may be employed.

In said annexed drawing:—

Fig. 1 is a fragmentary isometric view showing a portion of a door in accordance with the present invention; and Fig. 2 is a section taken along line II—II, Fig. 1.

Referring to the drawing, there is shown the vertical member or so-called stile of a door, formed of sheet metal from one piece and having a series of holes 7 punched along the edges, and being shaped up with beading or moulding 2, a right-angle reveal 4, and return flange 6. The return flanges are further provided with offsets, so that when bent into completed form, the flanges 6 come together and with a groove or longitudinal recess left between the moulding portions of the structure and such as to be capable of ultimately receiving a pane of glass or other stretcher element. The shaping of the construction may be accomplished by successive die operations or in a single compound die, as desired. The bends 8 may be of any desired form in accordance with particular requirements, but in the form shown are of right-angle type.

For securing the flanges 6 together, welding is employed, and in the case of arc welding this being readily accomplished at the holes 7. Spot welding may also if preferred, be employed, the holes 7 permitting the passage of the spot welding points. Or clips can be used, these being seated in the holes. The joint thus made is not only concealed from the outside, but interference with the free insertion of a stretcher element is avoided, since such weld metal as occurs is in a position in the edges of the holes beyond the line of the stretcher when inserted.

A joint of such character may thus be readily provided in framing elements generally, doors, windows, etc., and with the marked advantages of avoidance of obstruction in the path of a stretcher insert, while manufacturing procedure is also greatly favored by reason of the character of construction provided.

Other modes of applying the principle of the invention may be employed, change being made as regards the details described, provided the means stated in any of the following claims, or the equivalent of such, be employed.

I therefore particularly point out and distinctly claim as my invention:—

1. A sheet metal framing element having a longitudinal stretcher-receiving groove and a seam located within such groove comprising lapping inturned flanges presenting a series of weld holes exposing surfaces of adjacent flange-portions beyond the groove and weld-metal in relation thereto without obstructing the groove.

2. A sheet metal framing element having a single longitudinal seam, the edges being inturned to form the base of a groove for receiving the edge of a filler element and being joined by a series of welds made beyond such groove through holes punched at intervals in the inturned edge portion forming the groove.

3. A sheet metal framing element with moulding finish and having a single longitudinal seam, the edges being inturned to form a groove for receiving a filler element and then extending in parallelism in the general plane of the framing element and being united by a weld made beyond such groove through holes punched at intervals in the marginal portions of the inturned metal forming the groove.

4. A sheet metal stile having an integral moulding finish and having a single longitudinal seam, the edges being inturned to form a groove for receiving a filler element and being joined by a series of welds made beyond such groove through holes provided at intervals in the inturned edge-metal forming the groove.

Signed by me this 9 day of May, 1930.

EDWARD HELLER.